United States Patent [19]

Inagaki et al.

[11] Patent Number: 5,087,110
[45] Date of Patent: Feb. 11, 1992

[54] OPTICAL FIBER CABLE AND MANUFACTURE OF OPTICAL FIBER CABLE

[75] Inventors: Shinya Inagaki, Shinjuku; Sakae Yoshizawa, Setagaya; Kazuya Sasaki, Mitaka, all of Japan

[73] Assignee: Fujitsu Ltd., Kanagawa, Japan

[21] Appl. No.: 381,397

[22] PCT Filed: Feb. 9, 1990

[86] PCT No.: PCT/JP89/00130
§ 371 Date: Jul. 6, 1989
§ 102(e) Date: Jul. 6, 1989

[87] PCT Pub. No.: WO89/07779
PCT Pub. Date: Aug. 24, 1989

[30] Foreign Application Priority Data

Feb. 10, 1988 [JP] Japan ................................ 63-029259
Mar. 1, 1988 [JP] Japan ................................ 63-047952

[51] Int. Cl.⁵ ............................................. G02B 6/44
[52] U.S. Cl. ................................... 385/110; 385/112; 385/113
[58] Field of Search ........................... 57/3, 3.5, 7; 350/96.23, 96.24

[56] References Cited

U.S. PATENT DOCUMENTS 4,154,049  5/1979  King et al. .................... 350/96.23 X
4,781,434 11/1988  Kitagawa et al. ............... 350/96.23
4,787,702 11/1988  Khalil ............................. 350/96.23

OTHER PUBLICATIONS

International Application No. PCT/JP89/00130, filed Feb. 9, 1989 and English translation of amended claims.

Primary Examiner—John D. Lee
Assistant Examiner—Stephen W. Barns
Attorney, Agent, or Firm—Staas & Halsey

[57] ABSTRACT

The present invention relates to an optical fiber cable. In view of narrowing optical fiber cables, the spiral grooves to accommodate optical fiber cables are formed in the core loading material, in the longitudinal direction, by bundling high tensile strength synthetic resin fibers and covering the external circumference of the bundled material with a synthetic resin covering layer. Moreover, a method is disclosed for manufacturing an optical fiber cable which stably loads the optical fibers by holding the core loading material in order to eliminate deviation generated in the rotating direction around the core loading material on the occasion of loading fibers in the spiral grooves of core loading material.

17 Claims, 5 Drawing Sheets

OPTICAL FIBER CABLE AND MANUFACTURE OF OPTICAL FIBER CABLE

BACKGROUND OF THE INVENTION

1. Field of the Invention

The present invention relates to an optical fiber cable and more particularly to an optical fiber cable which realizes a reduction in size of a core loading material having a spiral groove to accommodate on optical fiber core and a method for manufacturing an optical fiber cable to accurately accommodate the optical fiber core to the spiral groove thereof.

2. Description of the Related Art

A cross-sectional view of an optical fiber cable of the prior art is shown in FIG. 1. In FIG. 1, an optical fiber core 1, which is formed by providing an optical fiber line consisting of a clad glass having the refractive index lower than that of a core glass and a silicon rubber layer covering the outside of the clad glass to the circumference of the core glass used as an optical transmission path and moreover covering and protecting outside of the fiber line with an outer sheath of a synthetic resin such as NYLON (trademark), polyethylene or polycarbonate, is set to about 0.5 mm to 0.9 mm in its outer diameter. This optical fiber core 1 is necessary to be protected from tension, side pressure or bending. In case several optical fiber cores 1 are bundled into a cable constitution, as shown in FIG. 2, such optical fiber cores are housed in the recessed grooves formed at the external circumference of the core loading material 3 made of molded synthetic resin such as NYLON, polycarbonate or other suitable material formed on the circumference of a tension member 2 which is preferably a steel wire or a fiber reinforcing synthetic resin rod material (FRP) coaxial with the core loading material. The recessed grooves are formed as spiral grooves 4 in the longitudinal direction. In FIG. 1 and FIG. 2, a total of eight (8) grooves are formed and an optical fiber core 1 is provided in three of the grooves. The number of optical fiber cores 1 and spiral grooves 4 may be set adequately. The external circumference of core loading material 3 housing the optical fiber cores 1 within the spiral grooves 4 is wound spirally in several layers by a tape 5 made of a synthetic resin such as NYLON and polyester and the external circumference is then covered with an outer sheath 6 made of synthetic resin such as vinyl chloride or polyurethane in order to protect the interior from environmental and mechanical influence. An optical fiber cable 7 is thus formed.

However, according to the optical fiber cable 7 of the prior art, a synthetic resin mold is formed by extrusion molding in order to constitute the spiral grooves 4 to accommodate optical fiber cores 1, resulting a problem that it is necessary to provide a large diameter, high tension member at the center in order to give strength to overcome the tension when it is laid to such mold. Thus, the outer diamond of optical fiber cable 7 becomes large as a result and thereby the weight per unit of length becomes heavier.

In addition, the prior art also has a problem that since the bottom part of spiral groove 4 is formed as a square shape for the convenience of manufacture, adequate clearance to the adjacent spiral groove 4 is necessary. The outer diameter of optical fiber cable 7 thus becomes large because the external pressure to be applied on the optical fiber core 1 is prevented by providing a margin to the spiral groove 4 for the optical fiber core 1.

The prior method of manufacturing optical fiber cable 7 will be explained with reference to FIG. 3. A long length core loading material 3 comprising therein a tension member 2 is wound around a cylindrical core loading material supply reel 8 having disk type edges at both ends. The end part of the core material 3 is released therefrom, transferred and moved linearly and is wound up by a take up reel 9 in the other side. In the linear part of core loading material 3 between the core loading material supply reel 8 and takeup reel 9, an optical fiber core loading apparatus 10 is disposed, along with a tape winding apparatus 11 which winds the tape around the core loading material loading optical fiber cores in the moving direction. In the optical fiber loading apparatus 10, the main body 13 rotatably driven by a motor 12 is provided with a plurality of arms 14. The end part of arm 14 is respectively rotatably provided with a core reel 15 would by a long length optical fiber core 1.

The optical fiber cores 1 are released from the respective core reels 15 and are loaded to the spiral grooves 4 of the core loading material 3. In FIG. 3 the spiral grooves 4 are not illustrated but these spiral grooves are formed in the condition as shown in FIG. 2. Concerning the torsional pitch of a spiral groove 4, a revolving gate depending on the torsion rate is given to the body 13 of the optical fiber core loading apparatus 10. The core reel 15 loads the core into the spiral groove 4 of the core loading material 3 while supplying the optical fiber core 1 by rotating around the circumference of core loading material 3.

The tape winding apparatus 11 located forward of the optical fiber core 1 loading position accommodates and protects the loaded optical fiber cores 1 so that the optical fiber cores 1 loaded cannot escape therefrom by densely and spirally winding the external circumference of core loading material 3 with the tape 5 of synthetic resin such as NYLON and polyester supplied from the tape reel 6. The reel is driven by a motor rotatably driving the rotating apparatus (not illustrated) to revolve around the core loading material 3. The outer sheath of cable 6 can be covered in the next process.

The method of manufacturing optical fiber cable of the present invention addresses a problem that the optical fiber cores 1 are not accurately loaded to the spiral grooves 4 and escape therefrom due to the mutual fine change of speed and torsional variation of core loading material 3 by the winding resistance force of tape 5. The moving speed of core loading material 3 and rotating rate for loading the optical fiber cores 1 to the spiral grooves 4 are detected and controlled so that they mutually match.

The problems described above tend to become more distinctive when the diameter of optical fiber cable 7 becomes smaller.

SUMMARY OF THE INVENTION

It is the first object of the present invention to realize a small diameter optical fiber cable and load as many optical fiber cores as possible.

It is the second object to assure high tension strength of the core loading material.

It is the third object of the present invention to provide a method for manufacturing an optical fiber cable in which the optical fiber cores may be loaded accurately into the spiral grooves of core loading material without dependence on the shape of core loading material.

In order to attain the objects described above, the present invention provides an optical fiber cable comprising a core loading material formed by bundled synthetic resin fiber material having a high tensile strength and a synthetic resin covering layer covering the outer circumference of such bundled synthetic resin fibers material, with the spiral grooves to accommodate optical fiber cores formed along the longitudinal direction in the external circumference of core loading material, optical fiber cores accommodated within such spiral grooves and an outer sheath covering the external circumference of the core loading material accommodating optical fiber core within the spiral grooves.

According to the first profile of constitution, a metal line or fiber reinforcing synthetic resin rod type tension member may be inserted in the longitudinal direction into the center of core loading material.

According to the first profile of constitution, a metal line or fiber reinforcing synthetic resin rod type tension member may be inserted in the longitudinal direction into the center of core loading material.

According to the second profile of constitution, the bottom of spiral groove of core loading material has a semicircular cross-sectional shape.

According to the third profile of constitution, the synthetic resin covering layer may be formed through intimate contact with the external circumference of core loading material including the spiral grooves.

According to the fourth profile of constitution, the synthetic resin covering layer may be formed, together with a permeation layer allowing penetration of resin to the surface of bundled material, at the external circumference of core loading material including the spiral grooves.

According to the fifth profile of constitution, the synthetic resin covering layer may also be formed in such a way that a thin plate of a belt type synthetic resin is provided in the longitudinal direction to cover the external circumference of the core loading material including the spiral grooves and the end regions in the width direction of the thin plate are joined by welding.

The present invention also provides, in order to attain the objects described previously, a method for manufacturing an optical fiber cable comprising the steps for transferring and moving, in the longitudinal direction, the core loading material forming the optical fiber core accommodating spiral grooves; loading the optical fiber core to the spiral grooves while the fiber cores are rotated around the axis of core loading material and covering the external circumference of core loading material loading optical fiber cores with the outer sheath; wherein a core loading material holding apparatus, which has a part engaging with the spiral grooves and revolves in synchronization with rotation of optical fiber cores, is provided to the section near the position where the optical fiber cores are loaded to the spiral grooves and the optical fiber cores are loaded to the spiral grooves while deviation of core loading material during transfer and movement is suppressed by the core loading material holding apparatus.

According to the first profile of manufacturing method, the part engaging with the spiral grooves of the core loading material holding apparatus may be formed by a plurality of rotatable bodies.

According to the second profile of manufacturing method, the core loading material may be formed by the synthetic resin molding.

According to the third profile of manufacturing method, the core loading material may be formed by the synthetic resin molding, allowing a metal line or fiber reinforcing synthetic resin rod type tension member to be inserted in the longitudinal direction at the center thereof.

According to the fourth profile of manufacturing method, the core loading material may be formed by the bundle synthetic resin fiber material having a high tensile strength and the synthetic resin covering layer covering the external circumference of the bundled material.

According to the fifth profile of manufacturing method, the synthetic resin covering layer may be formed through intimate contact on the external circumference of core loading material including spiral grooves.

According to the sixth profile of manufacturing method, the synthetic resin covering layer may be formed, together with the permeation layer allowing penetration of resin to the surface of bundled material, at the external circumference of core loading material including the spiral grooves.

According to the seventh profile of manufacturing method, the synthetic resin covering layer may also be formed in such a way that a thin plate of a belt type synthetic resin is provided in the longitudinal direction to cover the external circumference of the core loading material including the spiral grooves and the end regions in the width direction of the thin plate are joined by welding.

BRIEF DESCRIPTION DRAWINGS

DETAILED DESCRIPTION OF THE PREFERRED EMBODIMENTS

Figure 1:
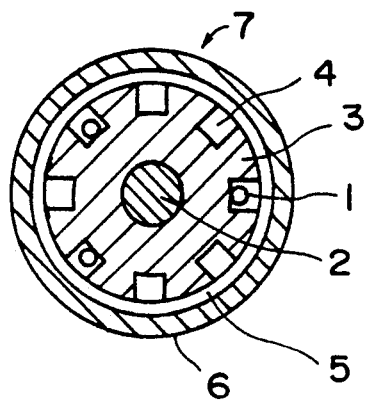
FIG. 1 is a cross-sectional view of an optical fiber cable of the prior art.
Figure 2:
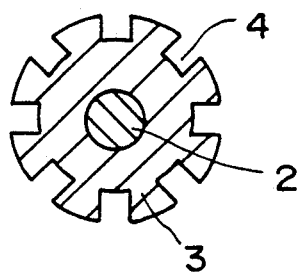
FIG. 2 is a cross-sectional view of only the core loading material shown in FIG. 1.
Figure 3:
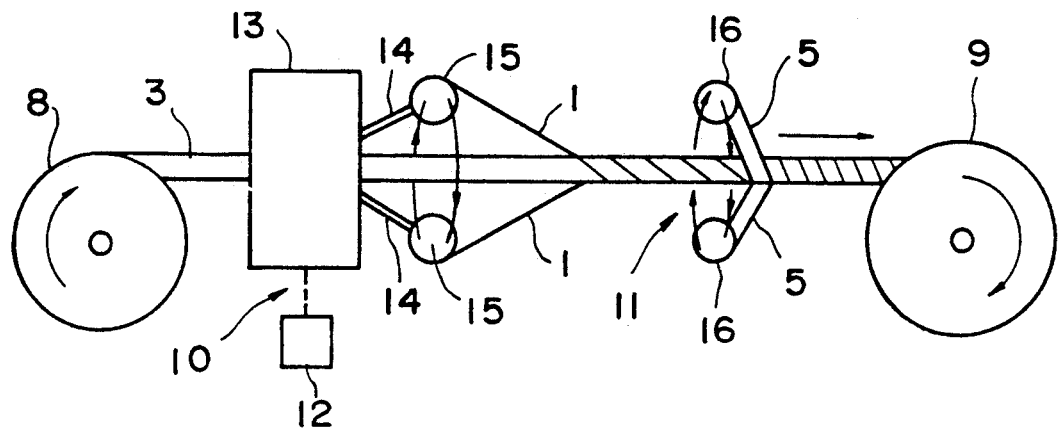
FIG. 3 is a schematic diagram explaining the method for manufacturing optical fiber cable of the prior art.
Figure 4:
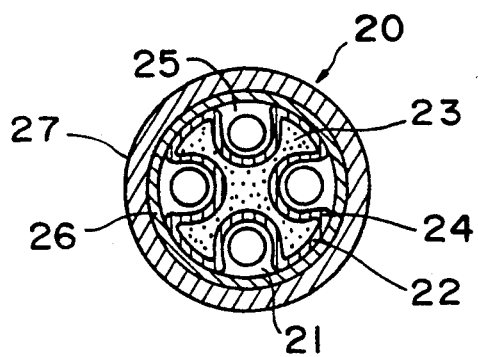
FIG. 4 is a cross-sectional view showing a first embodiment of the optical fiber cable of the present invention.

FIG. 4 is a cross-sectional view of an optical fiber cable of the present invention. In FIG. 4, the optical fiber core 21 is formed by an optical fiber line consisting of a core glass located at the center and used as the transmission path of optical signal, a clad glass layer, having a refractive index lower than that of core glass, provided on an external circumference of core glass and a silicon rubber layer covering the external circumference of clad glass layer and an outer sheath of synthetic resin such as NYLON, polyethylene or polycarbonate. The outer diameter of the optical fiber core 21 is set to 0.5 mm to 0.9 mm like the optical fiber core shown in FIG. 1.

The core loading material 22 is formed by bundling long-length synthetic resin fiber materials having a high tensile strength (for example, aromatic polyamide resin known by the trademark KEVLAR) with a high density, then compressing such fiber materials, forming the spiral grooves 25. Moreover, the external circumference of this bundled material 23 is covered with the synthetic resin covering layer 24, together with the spiral grooves 25. Thereafter, four spiral grooves 25 for accommodating optical fiber cores are formed at angular intervals of 90 degrees along the longitudinal direction of core loading material 22.

Accordingly, the four optical fiber cores 21 are loaded in the spiral grooves 25 of core loading material 22. The external circumference of core loading material 22 is wound by spirally with a synthetic resin tape 26 of the NYLON, polyester, or other suitable material, in several layers. Moreover, the external circumference is further covered with a synthetic resin outer sheath 27 of vinyl chloride or polyurethane, thereby completing an optical fiber cable 20.

The bottom of spiral groove 25 of core loading material 22 is semicircularly shaped and accommodates the optical fiber core 21 with a predetermined clearance. Accordingly, the optical fiber core 21 is protected from direct application of a compressive force applied from outside of optical fiber cable 20. Since the bottom of spiral groove 25 is formed in the semicircular shape, the interval between spiral grooves 25 can be reduced and the optical fiber cable 20 may be formed in smaller diameter. Alternatively, more optical fiber cores may also be accommodated in the core loading material. Moreover, since an internal stress is not concentrated on the bottom of the semicircular grooves, a mechanical strength of the core loading material 22 can be enhanced. As a result, many synthetic resin fibers having a high tensile strength can be compressed with higher density.

Figure 6:
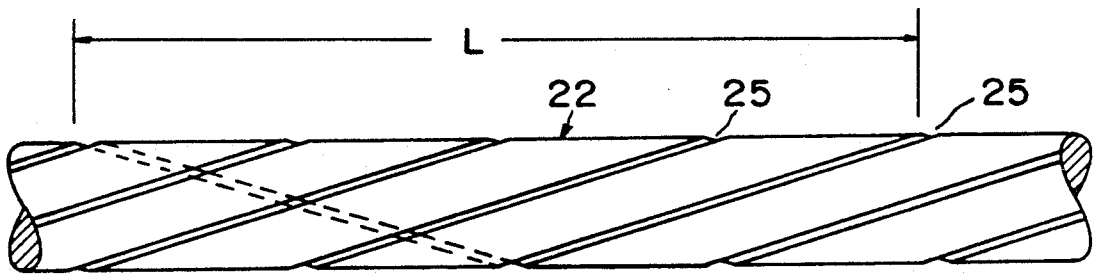
FIG. 6 is a side elevation of core loading material forming an optical fiber cable of the present invention.

Here, only one spiral groove 25 of core loading material 22 is considered, as shown in FIG. 6. A lead L corresponding to the pitch of spiral grooves is set usually to 100 mm to 500 mm and it is determined depending on the thickness of the core loading material 22 and the allowable bending radius of optical fiber core 21.

The mechanical strength of the aromatic polyamide fiber (synthetic resin fiber having high tensile strength), steel wire and FRP (fiber reinforcing synthetic resin) which are materials of bundled material 23 is indicated in the Table 1.

TABLE 1

| Material | |
|---|---|
| High tensile strength synthetic resin (aromatic polyamide fiber) | About 9000 |
| Steel wire | About 2000 |
| FRP | About 2000 |

In Table 1,
$\Delta$ = Young's modulus/specific gravity [kg cm$^3$/mm$^2$ gr]
$\Delta$ = [Young's modulus/specific gravity] in Table 1 is an index for suppressing elongation per unit cross-sectional area and unit weight and indicates that a high tensile strength synthetic resin fiber is exactly superior as a high tensile strength material.

As described above, a bundled material of synthetic resin fiber having a high tensile strength is strong and has a large resistivity to a tensile force. Therefore, such material suppresses elongation of a completed optical fiber cable 20 and sufficiently protects optical fiber core since such tensile force is not applied to the housed optical fiber core 21.

Since the core loading material 22 is formed by compressing fibers in a high packing density, if a pressing force is applied on the optical fiber cable 20 from the radius direction, deformation which may give influence on the transmission of optical signal is not generated on the housed optical fiber core 21.

Rigid strength for bending of optical fiber cable 20 is almost determined by the core loading material 22. However, since the bundled material 23 of core loading material 22 is formed by a high tensile strength synthetic resin fiber, it has adequate flexibility.

Figure 5:
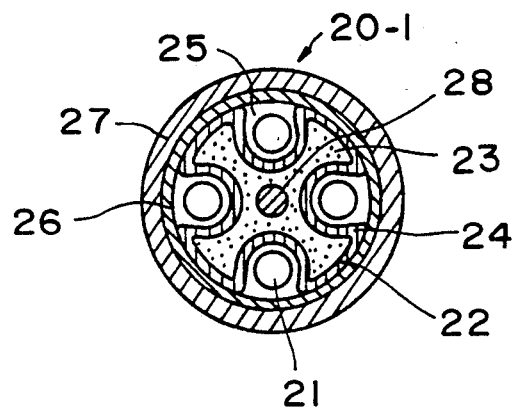
FIG. 5 is a cross-sectional view showing a second embodiment of optical fiber cable of the present invention.

A cross-sectional view of the second embodiment of an optical fiber cable of the present invention is shown in FIG. 5. In the optical fiber cable 20-1 shown in FIG. 5, a tension member 28 made of a metallic single wire or stranded wires such as a high tensile strength piano wire or stainless steel wire or fiber reinforcing synthetic resin rod type material (FRP) made of glass fiber, carbon fiber or high tensile strength synthetic resin fiber is inserted at the center of bundled material of high tensile strength synthetic resin fiber without increase of core loading material 22. The tension member 28 gives sufficient strength to the optical fiber cable 21-1 through cooperation therewith even if it may have a rather small diameter.

As described above, the optical fiber cable 20, 20-1 of the present invention realizes light weight and small diameter, assuring sufficient mechanical strength. For instance, tensile strength of typical optical fiber cable is 100 kg, with a diameter of 10 mm, and weight of 80 (gr/m), but in the present invention, the outer diameter is reduced almost to ½ (4 mm to 6 mm), while the weight is 1/5 or less.

Figure 7:
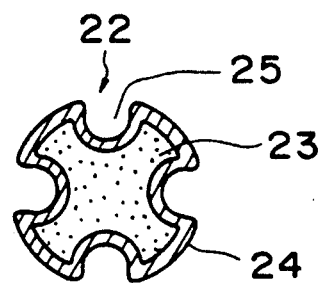
FIG. 7 is a cross-sectional view showing the first embodiment of the core loading material forming an optical fiber cable of the present invention.

The first embodiment of the method for manufacturing the core loading material of the present invention will be explained with reference to a cross-sectional view shown in FIG. 7. In FIG. 7, the core loading material 22 can be formed by bundling many long-length high tensile strength synthetic resin fibers (for example, aromatic polyamide fiber, such as KEVLAR, in high density and NYLON or polyethylene, for example, is impregnated thereto. Finally, these fibers are compressed with high pressure so that these fibers are combined and formed into a solid material which may no longer show nay deformation. In this case, the part which may become the spiral groove 25 is also formed. The bundled material 23 is thus formed. Next, the synthetic resin and synthetic resin bonding agent are applied to the external circumference including the spiral grooves 25 through intimate contact by the thermal pressurizing method to form the synthetic resin covering layer 24. Thereby, a comparatively strong shape can be attained. As this covering layer 24, a synthetic resin such as NYLON or polypropylene can be applied.

Figure 8:
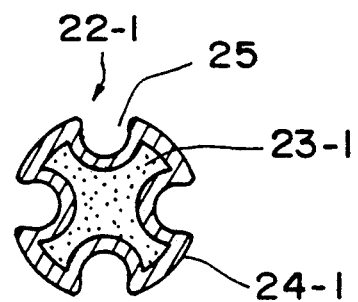
FIG. 8 is a cross-sectional view showing the second embodiment of the core loading material forming an optical fiber cable of the present invention.

The second embodiment of the method for manufacturing the core loading material of the present invention will be explained with reference to a cross-sectional view shown in FIG. 8. In FIG. 8, the core loading material 22-1 can be formed by bundling many long-length high tensile strength synthetic resin fibers in high density and NYLON or polyethylene, for example, is impregnated thereto. Finally, these fibers are compressed with high pressure so that these fibers are combine and formed into a solid material which may no longer show any deformation. In this case, the part which will become the spiral groove 25 is also formed. The bundled material 23-1 is thus formed. Next, the synthetic resin of the same kind as that impregnated by the NYLOn or polyethylene is applied to the external circumference including the spiral grooves 25 by the thermal dissolving method to form the synthetic resin covering layer 24-1. Thereby the covering layer can be integrally formed as the permeating layer impregnated by resin.

Figure 9:
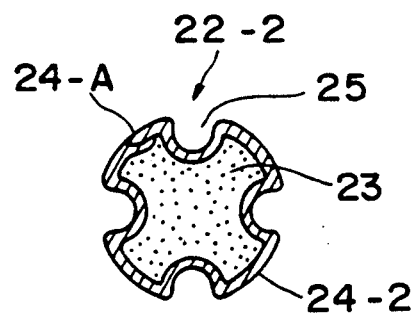
FIG. 9 is a cross-sectional view showing the third embodiment of the core loading material forming an optical fiber cable of the present invention.

The third embodiment of the method for manufacturing the core loading material of the present invention will be explained with reference to a cross-sectional view shown in FIG. 9. In FIG. 9, the external circumference including the spiral grooves 25 of the bundled material 23 is wound by a belt type synthetic resin thin plate by the thermal softening method through intimate contact therewith. The end portions 24-A in the width direction are joined by welding. The synthetic resin covering layer 24-2 of the core loading material 22-2 can be formed as explained above. The belt type synthetic resin thin plate is wound along the spiral direction of the spiral groove 25.

Figure 10:
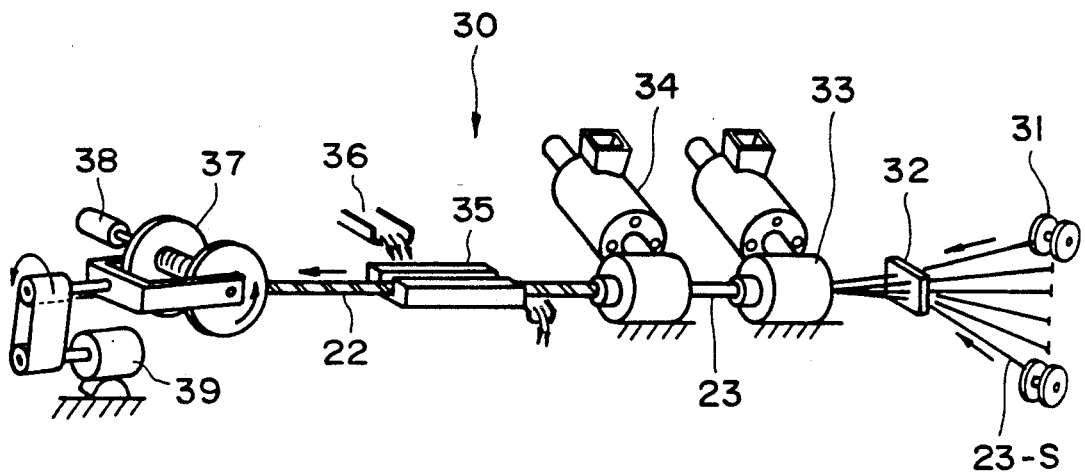
FIG. 10 is a schematic diagram explaining the first embodiment of the method for manufacturing the core loading material forming an optical fiber cable of the present invention.

FIG. 10 is a schematic diagram explaining the first embodiment of the method for manufacturing the core loading material to form an optical fiber cable of the present invention.

In a core manufacturing apparatus 30 shown in FIG. 10, the long-length high tensile strength synthetic resin fibers 23-S are wound around a plurality of fiber reels 31. The synthetic resin fibers are released from these fiber reels 31 and are bundled through the holes of concentrating plate 32 to enter the first extruded mold injector 33.

Within the first extruded mold injector 33, the synthetic resin fibers are impregnated, for instance, with NYLON or polyethylene to compress the bundled fibers with high density and the grooves are also formed. The grooves of bundled material 23 thus formed are linearly disposed in the longitudinal direction. The bundled fibers are applied to the second extruded mold injector 34. Within the second extruded mold injector 34, a synthetic resin such as NYLON or polypropylene is applied through intimate contact to the external circumference including the grooves of the bundled material 23 by the thermal pressurized molding and thereby a synthetic resin covering layer is formed. Moreover, the entire part is twisted to form the spiral grooves. Such twisting is carried out in such a manner that the core loading material 22 is rotated by a speed control type motor 38 and the core loading material reel 37 as a whole is revolved by a motor 39 to cause the twistable rotation of core material 22. The core loading material 22 leaving the second extruded mold injector 34, while it is twisted, passes through a cooling tank 35 in which the cooled liquid 36 is circulated. Thereby, the core loading material 22 is hardened by cooling.

Figure 11:
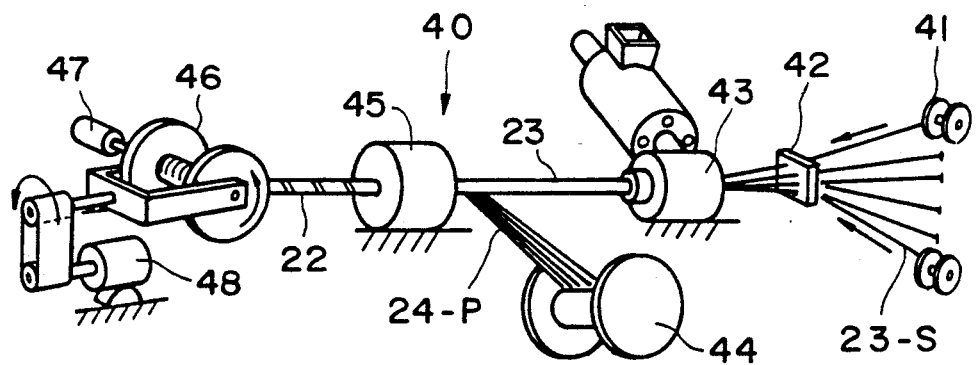
FIG. 11 is a schematic diagram explaining the second embodiment of the method for manufacturing the core loading material forming an optical fiber cable of the present invention.

FIG. 11 is a schematic diagram for explaining the second embodiment of the method for manufacturing the core loading material forming an optical fiber cable of the present invention. In a core manufacturing apparatus 40 shown in FIG. 11, many long-length high tensile strength synthetic resin fibers 23-S would on a plurality of fiber reels 41 are released and bundled through the holes of concentrating plate 42 to enter the extruded mold injector 43.

Within the extruded mold injector 43, the fibers are impregnated, for example, with NYLON or polyethylene and thereby the bundled fibers can be compressed in high density and the grooves are also formed in this step. The grooves of bundled material 23 thus formed are linear in the longitudinal direction. The bundled material is then sent to a thermal welding apparatus 45. Here, the belt type synthetic resin thin plate 24-P is also released from the thin plate reel 44 and is simultaneously applied to the thermal welding apparatus 45. This thin plate is thermally softened in this apparatus and is wound around the external circumference of bundled material 23 through intimate contact and the end portions in the width direction are joined by welding.

Figure 12:
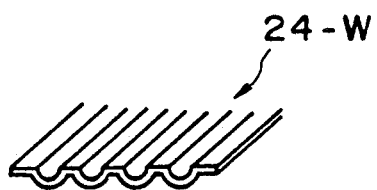
FIG. 12 is a partial perspective view of a belt type thin plate forming a synthetic resin covering layer.

The synthetic resin covering layer is formed as explained above and is thermally softened. Under this condition, the entire part is twisted and thereby the spiral grooves can be formed. Such twisting can be carried out in such a manner that the core loading material reel 46 for taking the core loading material 22 is rotated by a speed control type motor 47 and the core loading material reel 46 as a whole is also revolved by a motor 48 to cause twistable rotation of core loading material 22. The core loading material 22 leaving the thermal welding apparatus 45 is cooled and hardened through the cooling tank like that shown in FIG. 10. The synthetic resin thin plate 24-P may be a waving or corrugated synthetic resin thin plate 24-W providing the recessed grooves corresponding to the spiral grooves of the bundled material shown in FIG. 12.

Figure 13:
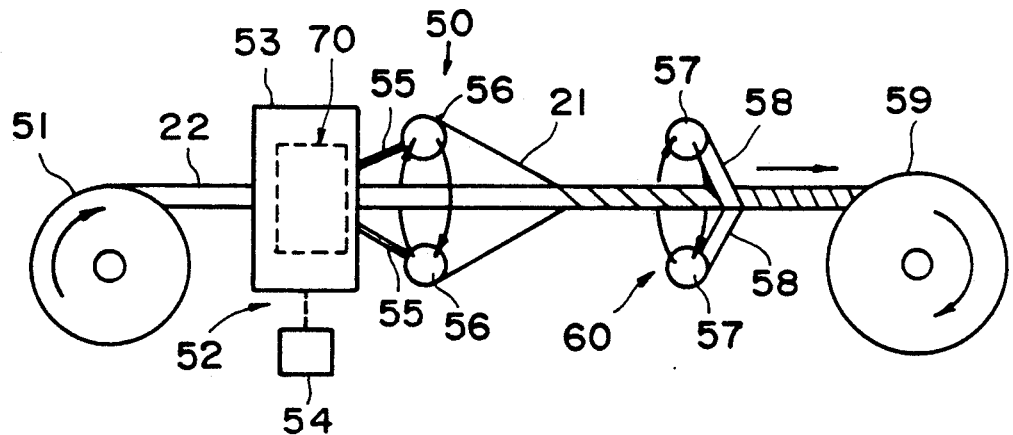
FIG. 13 is a schematic diagram explaining a method for manufacturing an optical fiber cable of the present invention.

FIG. 13 is a schematic diagram explaining a method for manufacturing an optical fiber cable of the present invention. In FIG. 13, a long-length core loading material 22 having a plurality of optical fiber core loading spiral grooves in the longitudinal direction at the external circumference is wound around a cylindrical core loading material reel 51 having disk edges at both ends thereof. The end part of core material 22 is released therefrom, transferred linearly in the arrow mark direction, and taken up by the takeup reel 59 provided on the other side. At the linear part of core loading material 22 between the core loading material supply reel 51 and the takeup reel 59, a fiber core loading apparatus 52 and a tape winding apparatus 60 which winds the tape in the moving direction are provided. In the optical fiber loading apparatus 52, the body 53 which is rotatably driven by the motor 54 is provided with a plurality of arms 55. The end part of each arm is respectively provided with a rotatable core reel 56 winding the long-length optical fiber 21. The body 53 is provided with the core loading material holding apparatus 70.

The optical fiber 21 is released from the core reel 56 and is loaded to the spiral groove 25 of the core loading material 22. In FIG. 13, the spiral groove 25 is not illustrated but it is formed in the condition shown in FIG. 6. Regarding a torsional pitch of a single spiral groove 25, the body 53 of optical fiber core loading apparatus 52 is given the rotating speed corresponding to the speed of twisting. The core reel 56 thus revolves around the core loading material 22 to load the core into the spiral groove 25 of core loading material 22 while it releases the optical fiber 21.

The tape winding apparatus located forward the position where the optical fiber 21 is loaded densely and spirally winds the external circumference of the core loading material 22 with the synthetic resin tape 58 of the NYLON and polyester released from the tape reel 57 revolving around the core loading material 22 by being driven by the motor which rotatably drives the rotating device (not illustrated) to protect the loaded optical fiber cores 21 from escape therefrom. Thereafter, coverage is provided as the outer sheath 27 in the next step.

Figure 14:
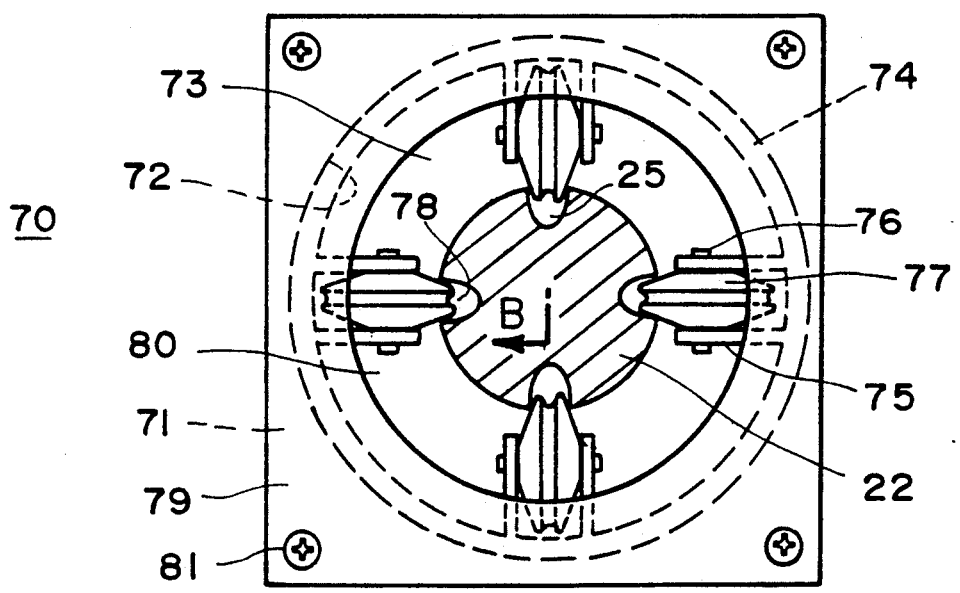
FIG. 14 is a front elevational view of a core loading material holding apparatus to be applied to FIG. 13.
Figure 15:
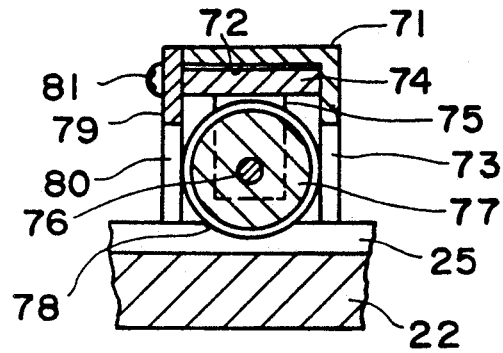
FIG. 15 is a cross-sectional view along the line B—B in FIG. 14.

The core loading material holding apparatus 70 provided to the body 53 of optical fiber core loading apparatus 52 will now be explained with reference to the front elevation shown in FIG. 14 and a cross-sectional view in FIG. 15 indicating the cross-section taken along the line B—B shown in FIG. 14. In these figures, the reference numeral 22 designates a core loading material. The inside of a box type body frame 71 which causes the core loading material 22 to pass through is provided with a circular recessed part 72. The bottom is provided with a circular through hole 73. A cylindrical roller supporting frame 74 engaging with the recessed part 72 of body frame 71 is integrally provided with four pairs of roller supporting arms 75 projecting toward the internal side in the radial direction. An axle 76 is engaged with the holes provided in each pair of supporting arms 75. A rotatable roller 77, which becomes narrower is profile at the circumference thereof, is rotatably supported by the axle 76 which mounts each roller. The narrowed circumference of the four rotatable rollers 77 respectively engages with four spiral grooves 27 of the core loading material 22. The rotatable rollers 77 are caused to rotate by linear movement of the core loading material 22.

The reference numeral 79 designates a holding plate in the same size as the body frame 71. A through hole 80 is bored at the center and it can be fixed by screwing to the body frame 71 with four corner screws 81. The body frame 71 and roller supporting 74 are positioned such that the roller supporting frame 74 is rotatable for the recessed part 72 under the condition that four screws 81 are loosened. The holding plate 79 is thus floated and when the screws 81 are tightened as shown in FIG. 15, both faces of the roller supporting frame 74 are pressed between the end face in the recessed part of body frame 71 and internal surface of holding plate 79 and is fixed to the body frame 71 so that it cannot rotate.

With the constitution described above, the function of the core loading material holding apparatus 70 will be explained. The body frame 71 is stationarily fixed to the body 53 of the optical fiber core loading apparatus 52. As explained previously, the core reel 56 rotating together with the body 53 revolves around the core loading material 22 in such a controlled speed as matching the twisting operation generate with movement of signal grooves of core loading material 22. Thereby, the core material holding apparatus 70 also revolves matching with the body 53. Here, in case torsional deviation is generated on the core loading material 22 in the rotating direction to generate relative positional error between the core reel 56 and spiral groove 25, restriction is made so that deviation is suppressed by the rotatable roller 77 rotatably engaging with the spiral groove 25 to eliminate positional error. Namely, the core material holding apparatus 70 holds the core loading material os that it does not deviate in the rotating direction and also synchronously holds the optical fiber core 21 to be loaded to the position of spiral groove 25. Thereby, it is no longer possible that the optical fiber cores 21 are not loaded into the spiral grooves 25 and escape therefrom.

The initial setting is explained hereunder. The end point of optical fiber core 21 is inserted and fixed to the spiral groove 25 of the core loading material extending between the core loading material reel 51 and the takeup reel 59. The rotating position of core reels 56 is matched, and the screws 81 of core loading material holding apparatus 70 are loosened to float the holding plate 79. Then, the roller supporting frame 74 is adequately rotated, and the screws 81 are tightened after confirming that the positional relation between the spiral grooves 25 of core loading material 22 and the rollers 77 is in the optimum condition and the roller supporting frame 74 is fixed to such position.

The rotatable rollers 77 of core loading material holding apparatus 70 are not restricted to four positions and it is enough when at least two rollers are used with an interval of 180 degrees and three rollers may also be used with an interval of 120 degrees. In addition, more rollers may also be used but it is preferable to provide them at equal intervals.

Position of core loading material holding apparatus 70 is not restricted only to the position shown in FIG. 13 and it may also be provided to the position including the area near the position where the optical fiber cores 21 are loaded into the spiral grooves 25. In this case, as shown in FIG. 14 and FIG. 15, a guide groove 78 is formed at the circumference of each rotatable roller 77 and the optical fiber core 25 is placed in contact with such guide groove 78 to assure reliable loading.

Although not apparent from the figure, each rotatable roller 77 is inclined together with the roller supporting arm 75 so that it matches the spiral direction of the spiral groove 25. Moreover, the body frame 71 and roller supporting frame 74 are made of synthetic resin or light alloy.

The core loading material holding apparatus in the above embodiments uses the rotatable roller but the present invention does not give restriction only to such roller and may use a slidably moving part engaging with the spiral groove and also allows application of a nut-shaped material which engages with a rod type screw.

The method for manufacturing optical fiber cable of the present invention include the core loading material shown in FIG. 1, FIG. 2, FIG. 4 and FIG. 5 and can naturally be applied to an optical fiber cable formed by the core loading material having other type of spiral grooves.

As explained previously, the present realizes a narrow optical fiber cable having high tensile strength and realizes stable loading of optical fiber cores to the spiral grooves of core loading material in manufacture of optical fiber cable.

What is claimed is:

1. An optical fiber cable comprising:
   a core loading material (22) which includes a bundled material (23) of high tensile strength synthetic resin fibers and having a plurality of spiraling optical fiber accommodating spiral grooves (25) formed in an outer circumferential surface thereof and a synthetic resin covering layer (24) covering the outer circumferential surface of said bundled material and a surface of said optical fiber accommodating spiral grooves (25);
   at least one optical fiber (21) housed in one of said spiral grooves; and
   an outer sheath (27) covering the core loading material housing said at least one optical fiber in one of the spiral grooves.

2. An optical fiber cable according to claim 1, wherein a metallic or fiber reinforcing synthetic resin rod type tension member (28) is disposed at the center of the core loading material (22) in the longitudinal direction.

3. An optical fiber cable according to claim 1, wherein a bottom portion of each spiral groove (25) of the core loading material has a semicircular cross-sectional shape.

4. An optical fiber cable according to claim 1, wherein the synthetic resin covering layer (24) covers the external circumference of the core loading material including the spiral grooves (25) and is applied as a coating.

5. An optical fiber cable according to claim 1, wherein the synthetic resin covering layer (24) is formed, together with a permeating layer impregnating the surface of bundled material (23) with resin, on the external circumference including the spiral grooves (25) and is applied as a coating.

6. An optical fiber cable according to claim 1, wherein the synthetic resin covering layer (24) is a belt type synthetic resin thin plate applied in the longitudinal direction, to the external circumference of the core loading material including the spiral grooves (25) through intimate contact and the end portions in the width direction of plate are joined by welding.

7. A method for manufacturing optical fiber cable comprising the steps of:
   forming optical fiber core loading spiral grooves (25) at an external circumference of a core loading material in the longitudinal direction;
   loading the optical fibers (21) in said spiral grooves (25) while they are rotated around the axis of said core loading material (22), and covering the external circumference of the core loading material (22) loaded with said optical fibers (21) with an outer sheath while synchronizing rotation of the optical fiber (21) with movement of the core loading material by synchronizing means, whereby deviation of core loading material (22) during transfer and movement is suppressed by said synchronizing means, said forming step comprising the steps of:
   (a) bundling material of long-length synthetic resin fibers arranged longitudinally;
   (b) compressing the bundled fibers to form at least one spiralling groove; and
   (c) covering an outer surface of the compressed bundled fibers and at least one spiralling groove with a layer of synthetic resin.

8. A method for manufacturing an optical fiber cable according to claim 7, wherein the synchronizing means includes a plurality of rotatable bodies engaging with the spiral grooves of core loading material holding apparatus (70).

9. A method for manufacturing an optical fiber cable according to claim 7, wherein the core loading material (22) is formed by synthetic resin molding.

10. A method for manufacturing an optical fiber cable according to claim 7, wherein the core loading material (22) is formed by synthetic resin molding and has a metallic line or fiber reinforcing synthetric resin rod type tension member (28) inserted in the longitudinal direction at the center thereof.

11. A method for manufacturing an optical fiber cable according to claim 7, wherein the core loading material (22) is formed by covering the bundled material (23) of high tensile strength synthetic resin fibers with a synthetic resin covering layer (24).

12. A method for manufacturing an optical fiber cable according to claim 11, wherein the synthetic resin covering layer (24) is formed by thermal welding.

13. A method for manufacturing an optical fiber cable according to claim 11, wherein the synthetic resin covering layer (24) is formed together with a permeating layer impregnating the surface of bundled material with resin, on the outer circumferential surface of the bundled material.

14. A method for manufacturing an optical fiber cable according to claim 11, wherein the synthetic resin covering layer (24) is formed by applying a belt type synthetic resin thin plate, through intimate contact, on the outer circumferential surface of the bundled material and joining both end portions in the width direction by welding.

15. A method of manufacturing a core loading material comprising:
   (a) bundling long-length synthetic resin fibers arranged longitudinally;
   (b) compressing the bundled fibers to form at least one spirally groove; and
   (c) covering an outer surface of the compressed bundled fibers and at least one spiralling groove with a layer of synthetic resin.

16. A method of manufacturing optical fiber cable comprising:
   (a) bundling long-length synthetic resin fibers arranged longitudinally;
   (b) compressing the bundled fibers to form at least one spirally groove;
   (c) covering an outer surface of the compressed bundled fibers and at least one spiralling groove with a layer of synthetic resin;
   (d) placing an optical fiber core in the at least one groove by rotating a core loading material holding apparatus around the core loading material while simultaneously and synchronously drawing the core loading material axially from a dispersing reel to a take-up reel; and
   (e) wrapping the core holding material with tape.

17. A method according to claim 16, further comprising covering the wrapped core holding material with a protective sheath.

* * * * *

UNITED STATES PATENT AND TRADEMARK OFFICE
CERTIFICATE OF CORRECTION

PATENT NO. : 5,087,110

DATED : February 11, 1992

INVENTOR(S) : Shinya Inagaki, Sakae Yoshizawa and Kazuya Sasaki

It is certified that error appears in the above-identified patent and that said Letters Patent is hereby corrected as shown below:

Column 1, line 10, "on" should be --an--.

Column 2, line 20, "would" should be --wound--.

Column 3, delete lines 20 through 23.

Column 6, line 42, after "flexibility" insert --assuring good work efficiency--.

Column 9, line 48, "is should be --in--.

Column 10, line 8, "generate" should be --generated--;
line 9, "signal" should be --spiral--;
line 18, "os" should be --so--;
line 66, "include" should be --includes--.

Signed and Sealed this

Fourteenth Day of December, 1993

Attest:

BRUCE LEHMAN

Attesting Officer          Commissioner of Patents and Trademarks